(12) United States Patent
Mitchell et al.

(10) Patent No.: US 9,438,374 B2
(45) Date of Patent: Sep. 6, 2016

(54) RADIO CHANNEL UTILIZATION

(71) Applicant: Microsoft Corporation, Redmond, WA (US)

(72) Inventors: Paul W. A. Mitchell, Seattle, WA (US); Amer A. Hassan, Kirkland, WA (US); Paul W. Garnett, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 13/930,414

(22) Filed: Jun. 28, 2013

(65) Prior Publication Data
US 2015/0003439 A1    Jan. 1, 2015

(51) Int. Cl.
*H04L 25/14* (2006.01)
*H04L 1/00* (2006.01)
*H04L 27/00* (2006.01)
*H04L 5/00* (2006.01)

(52) U.S. Cl.
CPC .......... *H04L 1/0041* (2013.01); *H04L 5/0042* (2013.01); *H04L 5/0053* (2013.01); *H04L 25/14* (2013.01); *H04L 27/0006* (2013.01); *H04L 5/0003* (2013.01); *H04L 2001/0096* (2013.01)

(58) Field of Classification Search
CPC . H04L 1/0041; H04L 25/14; H04N 21/6118; H04N 21/6168; H04B 10/25751; H04B 10/1143
USPC .......................... 370/343; 375/267, 222, 347
See application file for complete search history.

(56) References Cited

U.S. PATENT DOCUMENTS

| | | | |
|---|---|---|---|
| 5,444,697 A | 8/1995 | Leung et al. | |
| 5,459,469 A * | 10/1995 | Schuchman et al. | ........... 342/37 |
| 6,285,660 B1 * | 9/2001 | Ronen | ................. H04L 41/0896 370/259 |
| 7,372,820 B1 * | 5/2008 | Cheung et al. | ............... 370/252 |
| 8,612,627 B1 * | 12/2013 | Brandwine | ............. H04L 69/14 370/238 |
| 2006/0140251 A1 * | 6/2006 | Brown et al. | ................. 375/135 |
| 2009/0135952 A1 * | 5/2009 | Lee et al. | ...................... 375/316 |
| 2010/0124254 A1 | 5/2010 | Wu et al. | |
| 2012/0063373 A1 | 3/2012 | Chincholi et al. | |
| 2012/0224481 A1 | 9/2012 | Babiarz et al. | |

(Continued)

FOREIGN PATENT DOCUMENTS

| | | |
|---|---|---|
| EP | 0752765 A2 | 1/1997 |
| EP | 0993138 A2 | 4/2000 |
| WO | 2013/176889 A1 | 11/2013 |

OTHER PUBLICATIONS

"World's First TV White Space WiFi Prototype Based on IEEE 802.11af Draft Standard Developed", Retrieved at <<http://www.prnewswire.com/news-releases/worlds-first-tv-white-space-wifi-prototype-based-on-ieee-80211af-draft-standard-developed-174515051.html>>, Oct. 17, 2012, pp. 4.

(Continued)

*Primary Examiner* — Jamal Javaid
(74) *Attorney, Agent, or Firm* — Steve Wight; Sandy Swain; Micky Minhas

(57) ABSTRACT

The concepts relate to radio channel utilization. One example can channel bond a first available channel from a first radio frequency band with a second available channel from a second radio frequency band. The example can transmit a portion of a forward error correction coded data stream over the first available channel and a different portion of the forward error correction coded data stream over the second available channel.

20 Claims, 6 Drawing Sheets

(56) References Cited

U.S. PATENT DOCUMENTS

2012/0250631 A1 10/2012 Hakola et al.
2012/0275354 A1 11/2012 Villain
2012/0282942 A1 11/2012 Uusitalo et al.

OTHER PUBLICATIONS

"TV White Spaces", Retrieved at <<http://spectrumbridge.com/faqs.aspx>>, Dec. 24, 2012, pp. 10.

Tan, et al., "Enable Flexible Spectrum Access with Spectrum Virtualization", Retrieved at <<http://research.microsoft.com/pubs/172523/main.pdf, The Sixth IEEE Symposium on New Frontiers in Dynamic Spectrum Access Networks, DySPAN, Oct. 17, 2012, pp. 12.

Bahl, et al., "White Space Networking with Wi-Fi like Connectivity", Retrieved at <21 http://research.microsoft.com/pubs/80952/tvb.pdf>>, In ACM Sigcomm: Annual Conference of the Special Interest Group on Data Communications, Aug. 17, 2009, pp. 12.

International Search Report and Written Opinion, mailed Sep. 11, 2014, from PCT Patent Application No. PCT/US2014/043748, 12 pages.

Demand under Article 31/Response filed Dec. 23, 2014 to International Search Report and Written Opinion, mailed Sep. 11, 2014, from PCT Patent Application No. PCT/US2014/043748, 21 pages.

Written Opinion, mailed Jun. 16, 2015, from PCT Patent Application No. PCT/US2014/043748, 7 pages.

International Preliminary Report on Patentability mailed Sep. 14, 2015 from PCT Patent Application No. PCT/US2014/043748, 8 Pages.

* cited by examiner

RADIO CHANNEL UTILIZATION

BACKGROUND

Ever increasing numbers of wireless devices are being introduced and sold. As such, the radio frequency (RF) spectrum available for these wireless devices to communicate continues to get more and more crowded. Regulators organize and manage the RF spectrum as a set of bands. Individual bands can be managed differently than other bands. For instance, one band may be managed in bandwidth increments of one megahertz, while another band may be regulated in bandwidth increments of six megahertz.

Non-broadcast users can select between available channels in the various bands. However, at any given time, an individual band may not have enough bandwidth available to handle a communication task of an individual non-broadcast user.

SUMMARY

The described implementations relate to radio channel utilization. One example can channel bond a first available radio channel from a first radio frequency band with a second available radio channel from a second radio frequency band. The example can transmit a portion of an error correction coded data stream over the first available radio channel and a different portion of the error correction coded data stream over the second available radio channel.

Another example can receive a first data stream on a first radio channel of a first radio frequency band. This example can receive a second data stream on a second radio channel of a second radio frequency band. The two radio channels can be thought of as being bonded channels. This example can combine the first and second data streams. The example can also perform forward error correction coding to the combined first and second data streams to verify content of the combined first and second data streams.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio channels/frequencies. Wireless communication is increasing over the radio frequency (RF) spectrum. The RF spectrum is regulated in radio frequency bands or ranges (hereinafter, "bands"). Some bands are reserved for licensed users (and/or licensed users are given priority). Only some of these bands can be utilized by non-licensed users and their devices. Within the bands available to non-licensed use, devices can have difficulty finding a radio channel that they can utilize due to licensed use and competing non-licensed use. Even if a radio channel is identified, the radio channel may not have enough bandwidth for the device's desired use. In such a case, the band may not have any additional (and/or enough) additional radio channels to satisfy the bandwidth for the use. The present concepts can allow the device to identify other available radio channels in other bands. The device can perform channel bonding on the available radio channels from the two bands to satisfy its bandwidth requirements.

The present concepts can be applied to any radio channels in any bands. Some bands of interest that are discussed below relate to licensed bands where conditional non-licensed use is allowed. For instance, one such band is regulated for television (TV) broadcasting. Within the band are radio channels that are not used for TV broadcasting in a given geographical area. These channels can be referred to as "TV white space channels" or "TVWS channels". As used herein a "TV white space channel" means a radio channel or radio channel range that was reserved for TV broadcasting, but which is not actually used for TV broadcasting in a particular geographic region. Non-licensed use of these TV white space channels can be allowed subject to constraints. The constraints can serve to ensure that the non-licensed use does not interfere with licensed use in the band. TV white space channels represent one example of radio white space channels. "Radio white space channel" means a radio channel or radio channel range that was reserved for TV broadcasting, for other radio broadcasting, or two-way radio communications, but which is not actually used in such manner in a particular geographic region (at least not at particular times). Stated another way, radio white space can refer to allocated but unused portions of the radio spectrum. Note that the present discussion also relates to other types of bands that do not include radio white space channels. These aspects are described in more detail below.

System Examples

Figure 1:
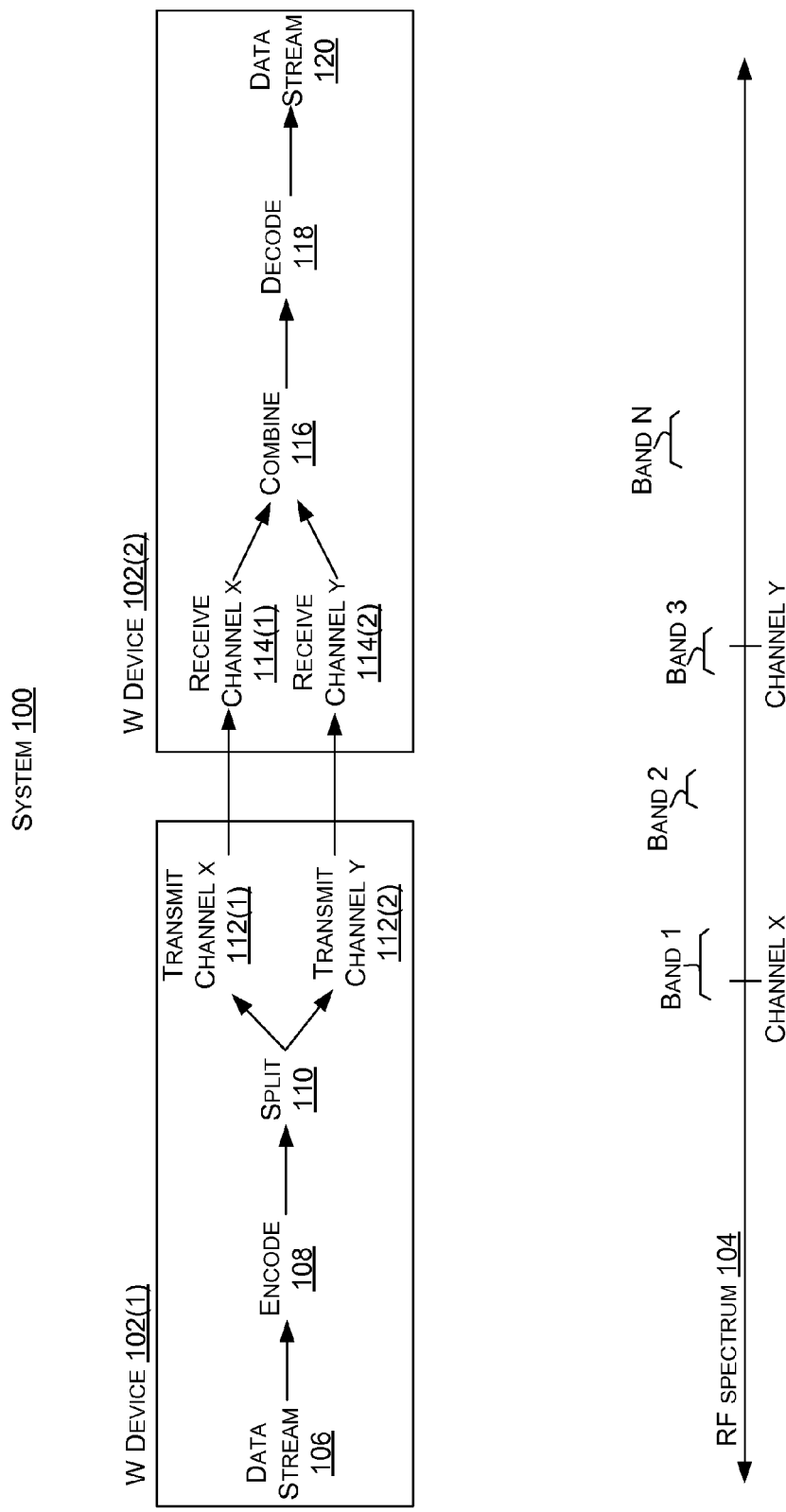
FIGS. 1-4 show examples of radio channel bonding systems in accordance with some implementations of the present concepts.

For purposes of explanation consider introductory FIG. 1, which shows a scenario involving a system 100 that includes a wireless device 102(1) that wants to communicate data to wireless device 102(2). Toward this end, wireless device 102(1) can attempt to identify radio channels that are available for use. For purposes of explanation, the RF spectrum is represented at 104. Also, four ranges or bands (e.g., band 1, band 2, band 3, and band N) are illustrated on the RF spectrum 104. Briefly, individual bands can be thought of as portions of the RF spectrum that are regulated for specific purposes by a regulatory entity. Specific bands are discussed in more detail below in the various examples.

In this case, device 102(1) has identified channel x in band 1 and channel y in band 3 as available channels. Device 102(1) can process a data stream 106 in preparation for sending the data over channel x and channel y (e.g., channel bonding channel x and channel y). In this case, the device can encode the data stream at 108. In this example, the encoding can entail two aspects. First, the encoding can entail modulating the data stream utilizing inverse fast fourier transform (IFFT). The second aspect can entail encoding the data stream in a redundant way using error correcting code (e.g., forward error correction). In an alternative configuration, the forward error correction can be performed on the data stream and then the IFFT can be performed. In such a case, performing the IFFT can entail identifying a portion of the RF spectrum that spans at least channel x and channel y. Any channels in the portion that are not involved in the channel bonding can be assigned a value of '0' for the IFFT process.

The device can split the encoded data stream into multiple portions at 110. In this example, the device can transmit a first portion of the split encoded data stream over channel x at 112(1). The device can transmit a second portion of the split encoded data stream over channel y at 112(2).

Wireless device 102(2) can receive the first portion of the split encoded data stream at 114(1) and can receive the second portion of the split encoded data stream at 114(2). Wireless device 102(2) can combine the first and second encoded data streams into a combined encoded data stream at 116. The wireless device can decode the combined encoded data stream at 118. In this example decoding can entail performing fast fourier transform (FFT) on the data stream and utilizing the forward error correction in the combined encoded data stream to reduce (or eliminate) transmission errors. Recall that the IFFT process described above can include a '0' value for channels not involved in the channel bonding. As such, the FFT process can include only the bonded channels (e.g., exclude extraneous channels) as data carriers. At 120, the decoding can recreate data stream 106 (or an approximation thereof) from the data carried by the bonded channels.

Figure 2:
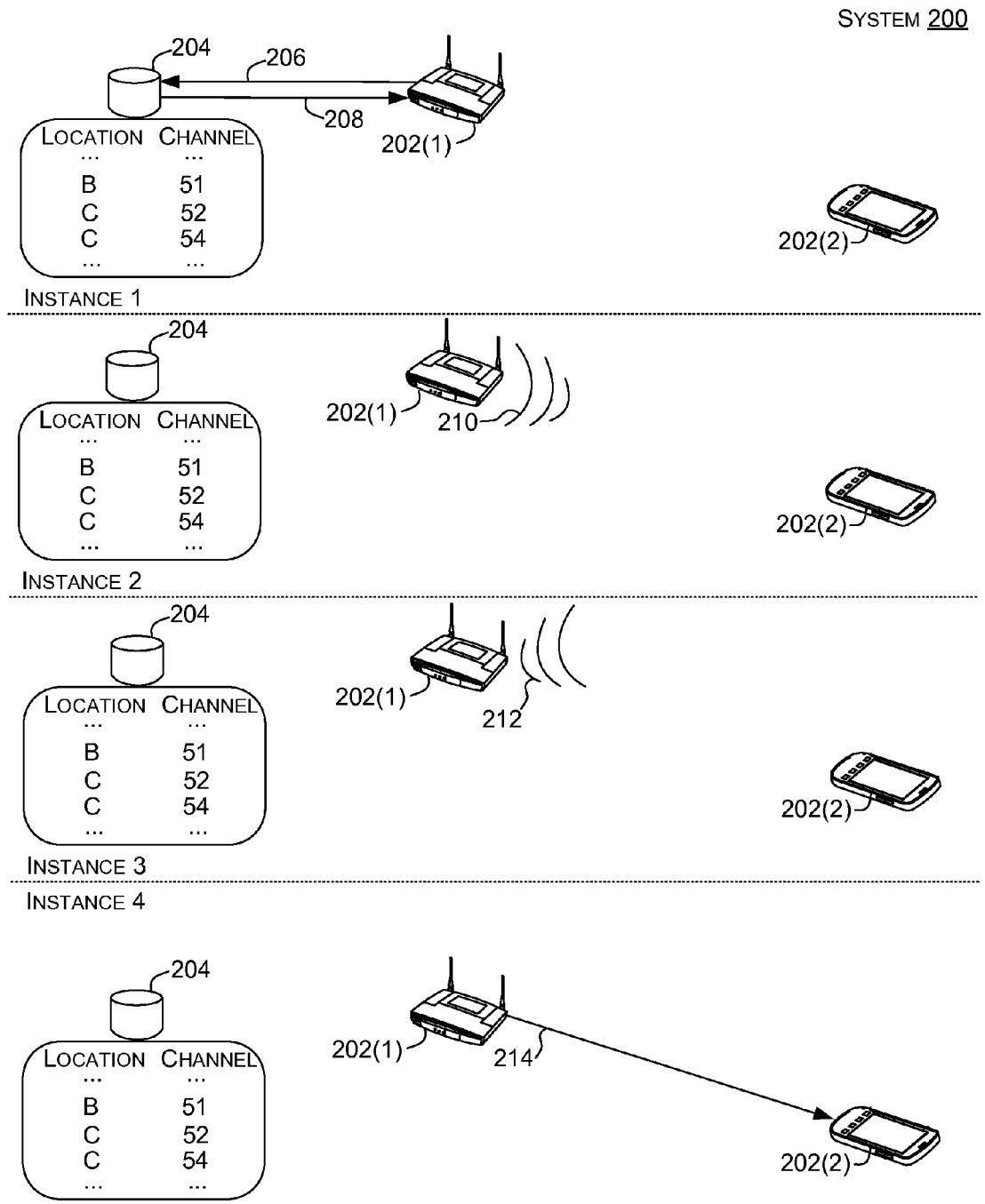

FIG. 2 illustrates another channel bonding system 200. The system includes a first device 202(1) that wants to set up a network, such as for communicating with device 202(2). In this case, assume that the first device 202(1) wants the network to have a throughput of 20 megabits per second (MBps). In this example, device 202(1) can be thought of as an access point (AP). For purposes of explanation, device 202(1) is illustrated as a wireless router, but could be another type of device. Similarly, device 202(2) is illustrated as a smart phone, but could be another type of device. Examples of other types of devices are described below relative to FIGS. 3-4. System 200 also includes a regulatory database in the form of a radio white space database 204. The radio white space database can authorize non-licensed use of radio channels within licensed bands. The authorization can be subject to various constraints (examples of which are described below).

At Instance 1, wireless device 202(1) can attempt to identify radio channels available for use. As part of this investigation, wireless device 202(1) can contact radio white space database 204 with its (e.g., wireless device 202(1)'s) location information as indicated at 206. Assume for purposes of explanation, that wireless device 202(1) is at hypothetical location 'B'. The radio white space database 204 can return one or more radio white space channels available for use at the location as indicated at 208. In this case, the radio white space database 204 can return radio white space channel '51' which is mapped to location B. The radio white space database can be thought of as constraining the use of radio white space channel 51 to the location B. Though not described here, the radio white space database can impose other constraints on the use of the radio white space channel. Assume that location B is located in a geographical region where radio white space channels, such as radio white space channel 51 have a bandwidth of six megahertz capable of delivering throughput of twelve megabits per second (Mbps).

At instance 2, recall that first device 202(1) wants to establish a network with a throughput of 20 Mbps. As such, the first device looks for additional radio channels to supply eight more Mbps of throughput. In this case, assume that the first device 202(1) investigates the 900 MHz industrial, scientific, and medical (ISM) band. In this example the investigating entails sensing radio channels in the ISM band as indicated at 210. Also, assume that the radio channels in this ISM band have a bandwidth of one megahertz (MHz) and throughput of two megabits per second (Mbps), and that the first device identifies four radio channels in this ISM band available for use. Of course, the ISM band is described here for the sake of example, but device 202(1) could alternatively or additionally investigate other bands for available radio channels of varying bandwidth and potential throughputs. At this point, device 202(1) can prepare to perform channel bonding of the radio white space channel 51 and the four ISM channels.

At instance 3, device 202(1) can convey information about the network that it is preparing to establish. The information can indicate that data transmission will be channel bonded over the radio white space channel 51 and the four ISM channels. In this implementation, the device 202(1) can convey the information over a control channel that can allow this information to be conveyed so that other devices can learn about the channel bonded communications as indicated at 212. In one configuration, the control channel can be a predefined control channel, such as an ISM channel, that devices can tune to in order to obtain information about channel bonded communications. Assume in this example that device 202(2) tunes to the control channel and receives the channel bonding information.

Instance 4 shows device 202(1) transmitting the channel bonded content over the radio white space channel 51 and the four ISM channels as indicated at 214. This transmission can be accomplished as described above relative to FIG. 1. Namely, device 202(1) can encode the content as a single stream. The encoded single stream can be divided proportionally to the bandwidth and available throughput of the bonded channels. In this case, approximately 60% of the encoded single stream can be proportioned to the radio white space channel 51 and approximately 10% of the encoded single stream can be proportioned to each of the available ISM channels. Stated another way, the radio white space channel 51 accounts for approximately 60% of the available throughput and can receive and deliver 60% of the content. Each ISM channel contributes approximately 10% of the bandwidth and throughput and can receive and deliver approximately 10% of the content.

Device 202(2) can be tuned to the radio white space channel 51 and the four ISM channels. Device 202(2) can receive the content over the five channels and recombine the content into a single stream. Device 202(2) can then decode the single stream to obtain the content.

Note that at Instance 3 above, the control channel can provide information about the radio channels that are bonded to communicate the data. Devices that want to receive the content can tune to the control channel to obtain the channel information and then tune to the bonded radio channels. This can be thought of as channel bonding with side information.

An alternative configuration can be thought of as blind receiving or blind demodulation of channel bonding. In this latter configuration, the receiving device can sense a large portion of the RF spectrum, such as 100 MHz to 1 GHz (for example). The receiving device can identify the radio channels within the portion that have energy (e.g. on which a signal is present). For instance, an energy level of sensed radio channels can be compared to a threshold. Sensed radio channels that fall below the threshold are not processed further and can be assigned a value of '0'. The sensed radio channels that satisfy the threshold can be further processed. For instance, the receiving device can attempt to decode/demodulate these radio channels. In some cases, the radio channels that satisfy the threshold can include individual radio channels that are not included in the channel bonding (e.g., radio channels that are being used by other devices). In such a case, the demodulation can fail.

For instance, for ease of explanation assume that the sensed spectrum includes hypothetical radio channels 1-10 and that channels 2, 3, and 7 are being channel bonded. However, channel 5 is in use by another device (e.g., channel 5 passes the energy threshold). In this case, the receiving device can attempt to demodulate the signals on radio channels 2, 3, 5, and 7 using FFT. The demodulation will be unsuccessful because of the content from channel 5. In this case, the demodulation can be performed on subsets of the radio channels until a combination is identified that is successfully demodulated. For instance, the combination of (2 and 3) can be tried as well as (2, 3, and 5), (2, 3, and 7) and (2, 5, and 7), etc. In this example, the demodulation of 2, 3, and 7 can be successful while the other combinations fail. Radio channels 2, 3, and 7 can then be decoded using forward error correction and/or other technique to reduce any transmission errors.

Figure 3:
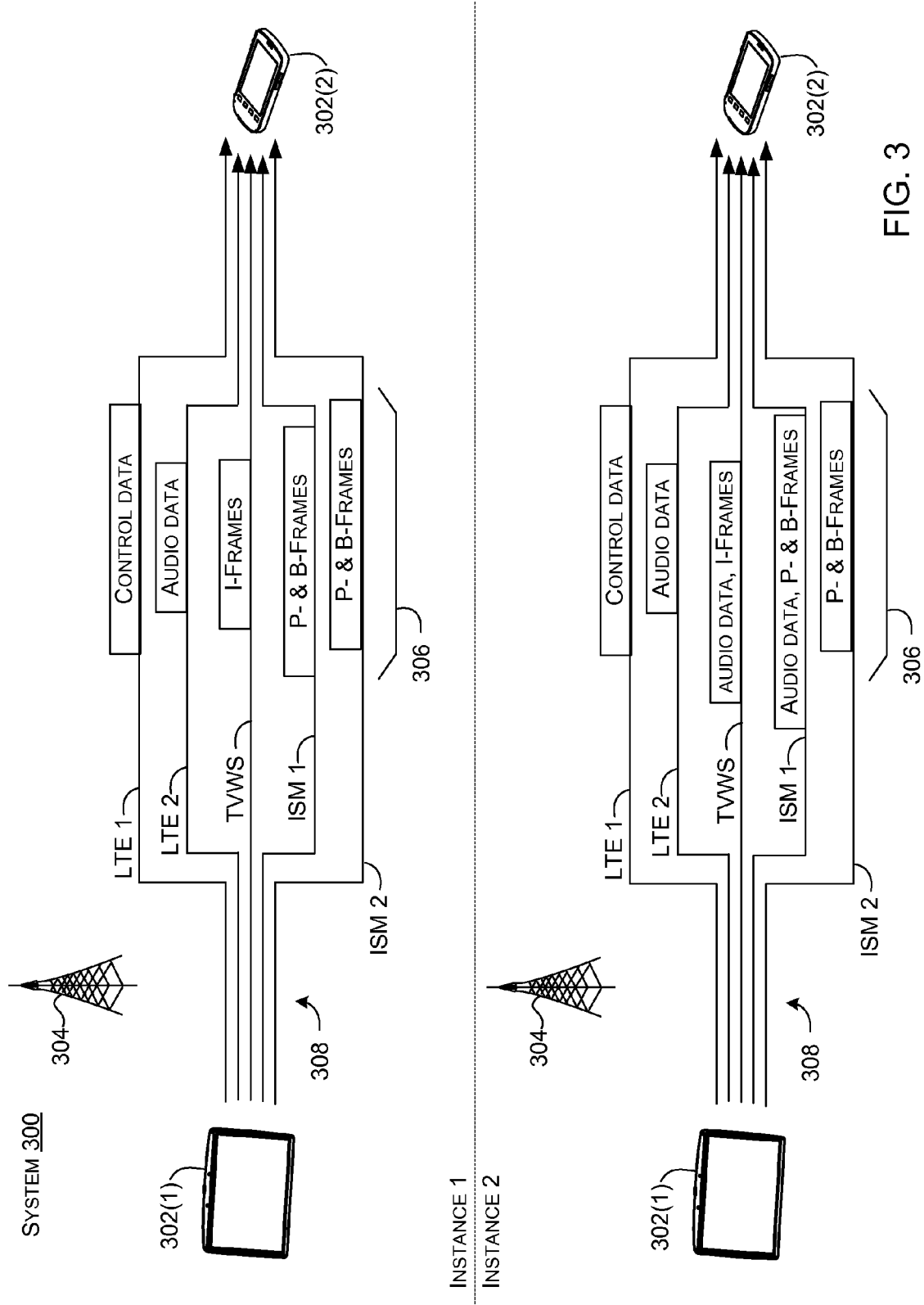

FIG. 3 shows another radio channel bonding system 300. In this case, the system includes devices 302(1) and 302(2) and a cell tower 304 that represents a service provider (or other entity). Assume that device 302(1) wants to communicate data 306 to device 302(2) over multiple bonded radio channels 308. Assume further that device 302(1) has a relationship with the service provider relating to cellular services. System 300 illustrates two concepts. The first concept is that individual radio channels that are bonded can offer different qualities, such as reliability. These qualities can be considered when determining which data to send over the individual bonded radio channels. Further, some portions of the data can be more important than other portions of the data. The relative importance of the data can be considered when deciding which portions of the data to send over individual radio channels. Assume in the illustrated example, that device 302(1) wants to communicate data to device 302(2) and that in this example the data is a video (e.g., audio data and video data). Towards that end, device 302(1) has obtained permission from the service provider (e.g. via cell tower 304) to use the first and second long term evolution (LTE) radio channels that are licensed to the service provider. Device 302(1) has also identified a TVWS radio channel and first and second ISM radio channels as available.

In this example, device 302(1) considers the LTE radio channels to be more reliable that the TVWS radio channel and the TVWS radio channel to be more reliable than the ISM channels. For instance, since the device has permission to use the LTE channels from the licensed user (e.g., the service provider), the device may be less likely to experience interference on the LTE channels. Similarly, the ISM channels may be considered the least reliable since other users may use these channels at any time. The TVWS radio channels can be considered to fall between the other two in that while the regulatory database (described above relative to FIG. 2) controls use of the TVWS radio channels, it may give authorization for non-licensed use to multiple parties in a geographical area at the same time.

In this example, device 302(1) may consider audio data from the video to be more important than the video data. The device may also consider some frames of the video to be more important than other frames. For instance, I-frames may be considered more important than P-frames and B-frames. The device 302(1) may also treat control data (as opposed to content data) as highly important.

Instance 1 shows the device 302(1) communicating data to device 302(2) over bonded radio channels LTE 1, LTE 2, TVWS, ISM 1 and ISM 2. As mentioned above, the relatively highly important data is the control data and the audio data and the highly reliable radio channels are LTE 1 and LTE 2. As such, the control data is communicated on LTE 1 and the audio data is communicated on LTE 2. The video I-frames are assigned a mid-level importance and are communicated on the TVWS channel. The video P-frames and B-frames are considered less important and are communicated on the ISM 1 and ISM 2 radio channels.

Instance 2 shows an alternative configuration. In this case, data that is deemed of high importance can be communicated on multiple channels to help ensure that it is successfully communicated to the receiving device 302(2). In this case, the audio data is communicated on LTE 2 radio channel. The audio data is also communicated on the TVWS radio channel with the I-frames and on the ISM 1 radio channel with the P-frames and the B frames. Thus, the relatively important data can be redundantly communicated to increase a likelihood that it is successfully received (in correct form) by the receiving device.

In the above example, data can be ranked in importance and relatively highly important data can be handled differently than less important data, such as sending the important data on more reliable bonded radio channels and the less important data on less reliable bonded radio channels. In other cases, applications may be handled differently based on their relative importance. For instance, assume that application A and application B are running on device 302(1) and both applications want to communicate data to device 302(2). Assume further that application A is determined to be more important than application B. In such a case, the more reliable bonded radio channels may be used to transmit data for application A while the less reliable bonded radio channels may be used to transmit data for application B.

Figure 4:
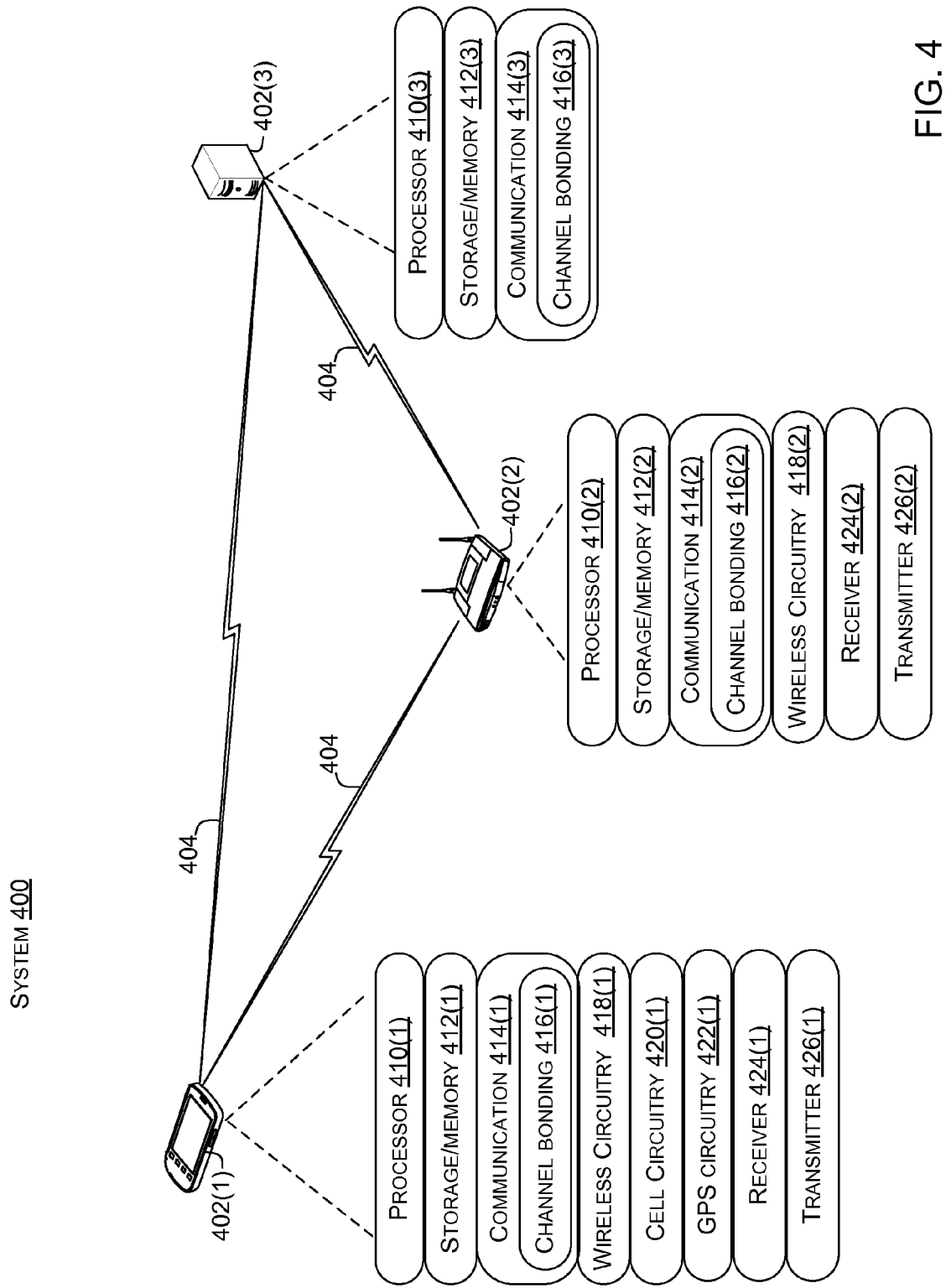

FIG. 4 shows a system 400 that can accomplish channel bonding concepts. Further, system 400 can include multiple devices. In the illustrated configuration, a first device is manifest as a mobile device 402(1), such as a smart phone, tablet, etc. A second device is manifest as an access point (AP) 402(2). In this case, the AP 202(2) is embodied as a wireless router. The third device is a computer 402(3), such as a server computer that may be manifest at a defined location or as cloud-based resources. Devices 402(1) and 402(2) can be thought of as further examples of devices 102, 202, and/or 302 described above relative to FIGS. 1-3. The above mentioned devices can communicate via single and/or bonded radio channels, as represented by lightning bolts 404.

The devices 402(1)-402(3) can include a processor 410, storage/memory 412, a communication manager or component 414 that can include a channel bonding module 416, wireless circuitry 418, cell circuitry 420, global positioning system (GPS) circuitry 422, a receiver 424, and/or a transmitter 426. Not all of these elements need occur on each device. Individual devices can alternatively or additionally include other elements, such as input/output devices (e.g., touch, voice, and/or gesture), buses, displays, graphics cards, etc., which are not illustrated or discussed here for sake of brevity.

For ease of explanation, in this discussion the use of a designator with the suffix, such as "(1)", is intended to refer to a specific element instance relative to a specific device. In contrast, use of the designator without a suffix is intended to be generic. Thus, a discussion of processor 410 is intended to be generic to all of the devices 402(1)-402(3), whereas a discussion of processor 410(1) is intended to be specific to mobile device 402(1). Of course, not all device implementations can be illustrated and other device implementations should be apparent to the skilled artisan from the description above and below.

The term "device", "computer", or "computing device" as used herein can mean any type of device that has some amount of processing capability and/or storage capability. Processing capability can be provided by one or more processors (such as processor 410) that can execute data in the form of computer-readable instructions to provide a functionality. Data, such as computer-readable instructions, can be stored on storage, such as storage/memory 412 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices 402 can include traditional computing devices, such as servers, personal computers, desktop computers, notebook computers, cell phones, smart phones, personal digital assistants, pad type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected (e.g., wired) to a network, such as with an Ethernet cable, and wirelessly communicate with devices over radio channels, such as radio white space channels and/or Wi-Fi channels, among others.

In the illustrated implementation, devices 402 are configured with a general purpose processor 410 and storage/memory 412. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

In another example, the receiver 424 and/or the transmitter 426 can be embodied on a SOC as a cognitive radio. A cognitive radio can tune to large portions of the radio spectrum at once. The cognitive radio can then ignore signals on channels that are not of interest.

Wireless circuitry 418 can facilitate communication over various radio channels, such as radio white space channels, Wi-Fi™ channels, Bluetooth™ channels, etc. The cell circuitry 420 can be thought of as a subset of the wireless circuitry relating to cellular radio channels. The cellular circuitry can handle communications over cell data channels and cell control channels. The GPS circuitry 422 can utilize GPS satellite signals to calculate the device's location.

The receiver 424 and the transmitter 426 can function to transmit and receive data at various radio channels. For example, the receiver 424 and the transmitter 426 can be configured to operate at specific radio channels, such as 2.4 gigahertz channels, 5.0 gigahertz channels, 60 gigahertz channels, radio band channels, and/or TV channels (50 megahertz to 810 megahertz), among others. Alternatively, the transmitters and receivers can be configured to tune to any channels or set of channels in the RF spectrum. Transmitter 426 can be configured to transmit at a specific power or a range of powers. For instance, the transmitter can be configured to transmit at 0.01 milliwatt (mW) or a range of powers from 0 to 0.01 mW. The transmitter can have different power limits for different channels. For instance, a Wi-Fi transmission power limit may be lower than a TVWS power limit. The receiver 424 can be configured to perform the signal sensing on multiple radio channels at once. Similarly, the transmitter can be configured to transmit on multiple radio channels at once.

While discrete components or elements are illustrated, some implementations may combine elements. For instance, wireless circuitry 418 may include dedicated receivers and transmitters rather than interfacing with distinct receivers and transmitters 424 and 426, respectively. The wireless circuitry 418, cell circuitry 420, GPS circuitry 422, receiver 424, and/or the transmitter 426 can be hardware based or a combination of hardware and software. The circuitry may utilize a system on a chip (SOC) configuration (described above), such as in the above mentioned cognitive radio.

The communication manager 414 can cause the receiver 424 to tune to specific radio channels (and/or sets of bonded channels) and sense for signals. Similarly, the communication manager can cause the transmitter 426 to transmit on specific radio channels (and/or sets of bonded radio channels. The channel bonding module 416 can be configured to perform various functions relating to the transmitting and/or receiving. For instance, in the transmitting context the communication manager can identify available radio channels for use. The channel bonding module 416 can determine the collective bandwidth and/or throughput of the available radio channels. The channel bonding module can determine what percentage of the collective bandwidth and/or throughput is contributed by each radio channel so that the data can be divided appropriately. Further, the channel bonding module can determine relative reliabilities between the available radio channels. In a similar manner, the channel bonding module can determine relative importance of specific types of data to be communicated. The channel bonding module can then direct specific content to specific radio channels based upon the relative importance and relative reliability. This aspect is discussed above relative to FIG. 3. The channel bonding module can perform (or oversee) the encoding of the data, such as the IFFT, forward error correction coding, and/or cyclic redundancy check (CRC), among others.

On the receiving side, the channel bonding module 416 can perform (or oversee) recombination of the data received over the bonded radio channels. The channel bonding module can cause FFT to be performed on the data. The channel bonding module can oversee error correction, such as forward error correction checking of the data and/or cyclic redundancy checking (CRC) of the data, among others.

In summary, in some cases the communication manager 414 can be configured to channel bond an individual channel from an individual radio frequency band with another channel from another individual radio frequency band. The communication manager can be further configured to send a data stream over the bonded channels. In a similar manner, the communication manager can receive data over multiple bonded channels. The communication manager can recombine the data from the bonded channels to obtain 'original' content (e.g., content that existed on a sending device).

Method Examples

Figure 5:
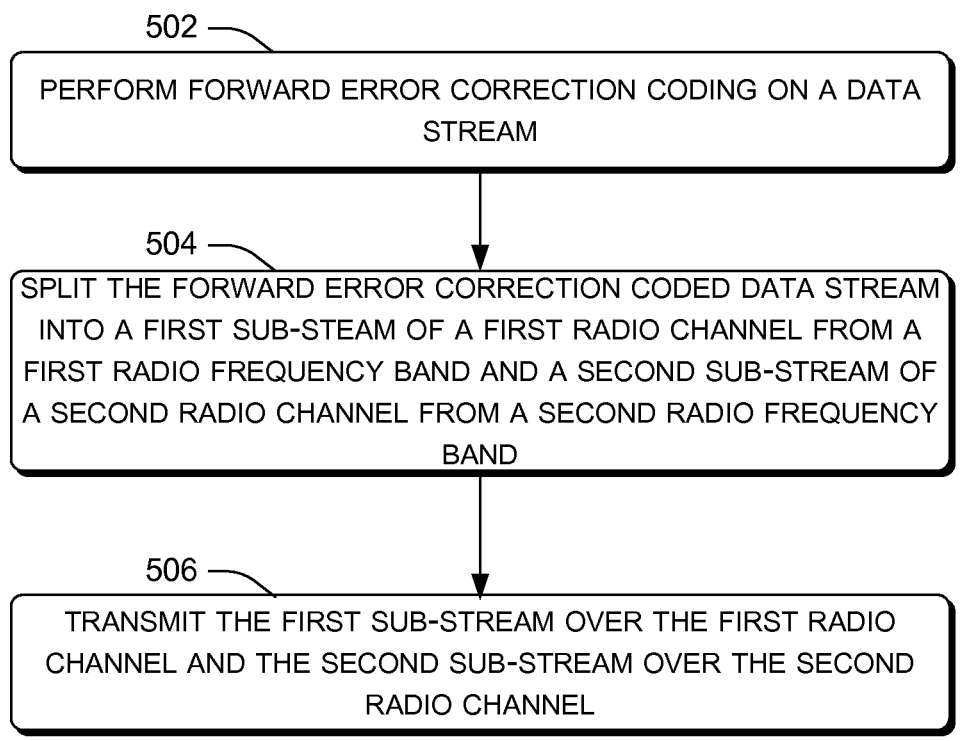
FIGS. 5-6 are flowcharts of examples of radio channel bonding techniques in accordance with some implementations of the present concepts.

FIG. 5 shows a channel bonding method 500 from a transmission perspective.

The method can perform forward error correction coding on a data stream at 502. Additional and/or alternative types of coding can be performed on the data stream. For instance, an inverse fast fourier transform can be applied to the data stream and/or cyclic redundancy check can be applied.

The method can split the forward error correction coded data stream into a first sub-steam of a first radio channel from a first radio frequency band and a second sub-stream of a second radio channel from a second radio frequency band at 504. Of course, more than two radio channels and/or more than two sub-streams can be employed. In some cases, radio channels can be identified for channel bonding and the bandwidths of the radio channels can be determined. Additional available radio channels can be identified until a combined bit rate of the bonded channels (e.g., combined throughput) satisfies a bit rate of the application or applications.

The method can transmit the first sub-stream over the first radio channel and the second sub-stream over the second radio channel (e.g., the bonded radio channels) at 506. The transmitting can be done on a proportional basis to the throughputs of the bonded radio channels.

Stated another way, a similar method can be characterized as channel bonding a first available channel from a first radio frequency band with a second available channel from a second radio frequency band. This method can involve transmitting a portion of a coded data stream over the first available channel and a different portion of the coded data stream over the second available channel. Channel bonding of two channels is described for sake of brevity, but of course more than two channels can be channel bonded.

Figure 6:
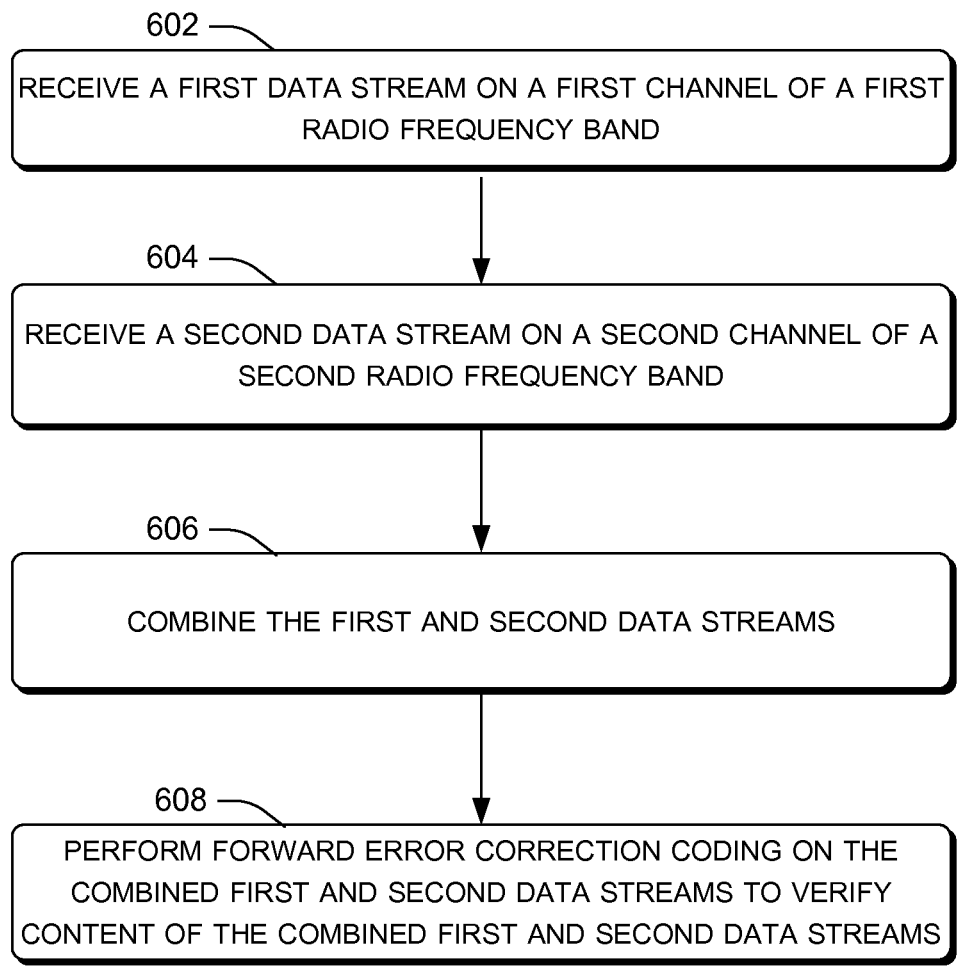

FIG. 6 shows another channel bonding method 600 from a receiver perspective.

The method can receive a first data stream on a first channel of a first radio frequency band at 602. In some cases, the first radio frequency band can be a band with licensed use, such as LTE or TV. In other cases, the first radio frequency band can be reserved for unlicensed use, such as an ISM band.

The method can receive a second data stream on a second channel of a second radio frequency band at 604. In some cases, the first data stream is delivered at a different throughput than the second data stream. For instance, the first data stream may be on a TVWS radio channel that is set at six megahertz of bandwidth and capable of 12 megabits per second of throughput, whereas the second radio channel may be an ISM radio channel that is set at one megahertz of bandwidth and capable of 2 megabits per second of throughput. In other cases, the channels may have similar properties. Further still, more than two types of radio channels may be bonded. For instance, third, fourth, and/or more data streams can be channel bonded over a set of radio channels.

The method can combine the first and second data streams at 606. In some cases, the combining can entail performing fast fourier transform on the first and second data streams.

The method can perform forward error correction coding on the combined first and second data streams to verify content of the combined first and second data streams at 608. The method can store and/or present the verified content in any manner that content is currently handled.

Stated another way, a similar method can be characterized as receiving data over a set of dissimilar radio channels. The radio channels can be dissimilar in that they are from different radio bands. The method can involve recombining the data to obtain data in a form that existed on a sending device (e.g., the original data).

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to radio channel bonding are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
performing forward error correction coding on a data stream;
calculating a desired throughput for the forward error correction coded data stream;
determining a first radio channel from a first radio frequency band with a first throughput;
in response to the first throughput being less than the desired throughput, determining a second radio channel from a second radio frequency band with a second throughput;
proportionally splitting the forward error correction coded data stream into a first sub-stream and a second sub-stream based on the first throughput and the second throughput; and,
transmitting the first sub-stream over the first radio channel and the second sub-stream over the second radio channel to achieve the desired throughput.

2. The method of claim 1, wherein the performing further comprises performing an inverse fast fourier transform on the data stream.

3. The method of claim 2, wherein the inverse fast fourier transform records a value of zero for other radio channels in the radio frequency spectrum that are not the first radio channel or the second radio channel.

4. The method of claim 1, further comprising querying a regulatory database with location information and receiving the first radio channel from the regulatory database based upon the location information.

5. The method of claim 1, the determining the first radio channel further comprising identifying the first radio channel as available for use and determining a bandwidth of the first radio channel.

6. The method of claim 1, wherein:
the first and second sub-streams are equivalently sized and the first and second radio channels have equivalent bandwidths and equivalent throughputs, or
the first and second sub-streams are differently sized and the first and second radio channels have different bandwidths and different throughputs.

7. The method of claim 1, further comprising, in an instance where a combined throughput of the first radio channel and the second radio channel is less than the desired throughput for the forward error correction coded data stream, identifying additional radio channels to handle additional sub-streams.

8. A device, comprising:
wireless circuitry including a receiver and a transmitter configured to receive and send signals over radio channels of different radio frequency bands; and,
a communication manager configured to
obtain a desired throughput for a data stream,
identify an individual radio channel of a first radio frequency band with a first throughput,
in response to the first throughput being less than the desired throughput, identify at least one additional radio channel of at least a second radio frequency band, the at least one additional radio channel having a second throughput,
proportionally split the data stream into a first sub-stream and a second sub-stream based at least in part on the first throughput and the second throughput, and
cause the transmitter to send the first sub-stream over the individual radio channel and the second sub-stream over the at least one additional radio channel.

9. The device of claim 8, wherein the communication manager is further configured to access a regulatory database with location information relating to the device and to obtain permission to use the individual radio channel of the first radio frequency band from the regulatory database.

10. The device of claim 9, further comprising global positioning system (GPS) circuitry configured to provide the location information to the communication manager.

11. The device of claim 8, wherein the individual radio channel is identified based at least in part on a reliability level of the individual radio channel.

12. The device of claim 8, wherein:
the at least one additional radio channel comprises multiple additional radio channels and the second sub-stream comprises multiple sub-streams,
the second throughput is a combined throughput of the multiple additional radio channels, and
the communication manager is further configured to cause the transmitter to send the multiple sub-streams of the second sub-stream over the multiple additional radio channels.

13. A device, comprising:
a processor; and
storage storing computer-executable instructions which, when executed by the processor, cause the processor to:
obtain a desired throughput of a data stream;
identify a first radio channel from a first radio frequency band, the first radio channel having a first throughput;
in response to the first throughput being less than the desired throughput of the data stream, identify a second radio channel from a second radio frequency band with a second throughput;
split the data stream into a first data portion and a second data portion based at least in part on the first throughput and the second throughput; and,
transmit the first data portion over the first radio channel and the second data portion over the second radio channel.

14. The device of claim 13, wherein the first radio channel is identified based at least in part on a relative importance of the first data portion and a relative reliability of the first radio channel.

15. The device of claim 14, wherein the first data portion has a higher importance than the second data portion.

16. The device of claim 15, wherein the second radio channel has a lower relative reliability than the first radio channel.

17. The device of claim 16, wherein the first data portion comprises audio data and the second data portion comprises video data.

18. The device of claim 13, wherein the first radio channel is identified based at least in part on a relative importance of the first data portion and the computer-executable instructions further cause the processor to transmit the first data portion over a redundant radio channel based at least in part on the relative importance of the first data portion.

19. The device of claim 13, wherein the computer-executable instructions further cause the processor to split the data stream into at least one additional data portion and transmit the at least one additional data portion over at least one additional radio channel to achieve the desired throughput of the data stream.

20. The device of claim 19, wherein the first radio channel is identified based at least in part on a relative importance of the first data portion and a relative reliability of the first radio channel, and the computer-executable instructions further cause the processor to identify the second radio channel and the at least one additional radio channel based at least in part on relative reliabilities of the second radio channel and the at least one additional radio channel and corresponding respective importance levels of the second data portion and the at least one additional data portion.

* * * * *